United States Patent [19]
Ohta

[11] 3,917,402
[45] Nov. 4, 1975

[54] METHOD AND APPARATUS FOR COLLATING PATTERNS
[75] Inventor: Wasaburo Ohta, Yokohama, Japan
[73] Assignee: Ricoh Co., Ltd., Tokyo, Japan
[22] Filed: June 17, 1974
[21] Appl. No.: 480,298

[30] Foreign Application Priority Data
June 29, 1973 Japan.............................. 48-74073

[52] U.S. Cl. ............. 356/71; 250/213 VT; 356/164
[51] Int. Cl.² .......................................... G06K 5/00
[58] Field of Search ............ 356/71, 164, 165, 166, 356/168; 250/213 VT, 213 R; 313/103

[56] References Cited
UNITED STATES PATENTS
3,313,940  4/1967  Goodrich..................... 250/213 VT Primary Examiner—Paul A. Sacher
Assistant Examiner—Richard A. Rosenberger
Attorney, Agent, or Firm—Cooper, Dunham, Clark, Griffin & Moran

[57] ABSTRACT

A method and apparatus to collating patterns, which is capable of detecting non-overlapping portions of two or more patterns. The apparatus comprises a channel plate having a recovery time response, a phosphor screen for converting secondary electrons emitted by the plate into a scintillation image, and means for controlling the motion of the secondary electrons from the plate toward the phosphor screen. The non-overlapping portions are illuminated on the phosphor screen in a noticeable manner.

6 Claims, 3 Drawing Figures

METHOD AND APPARATUS FOR COLLATING PATTERNS

BACKGROUND AND OBJECT OF THE INVENTION

The invention relates to a method of and apparatus for collating patterns.

Collation of patterns is used in various fields, including identification of seal impressions and fingerprinters, determination of the authenticity of paper currency, comparison of spectral lines in spectroscopy, as well as in checking of typographical errors. The typical collation scheme relies on visual inspection by an operator, in which differences between a reference pattern and a pattern to be collated are searched for. This requires a special training of the collating operator, and eye fatigue often prevents a collating operation from being continued over a prolonged period of time. In addition, such operation is inefficient because of the possibility of overlooking certain differences.

It is an object of the invention therefore, to provide a method of and apparatus for collating patterns which permits differences between similar patterns to be detected in a ready and reliable manner.

DETAILED DESCRIPTION OF THE EMBODIMENTS

Figure 1:
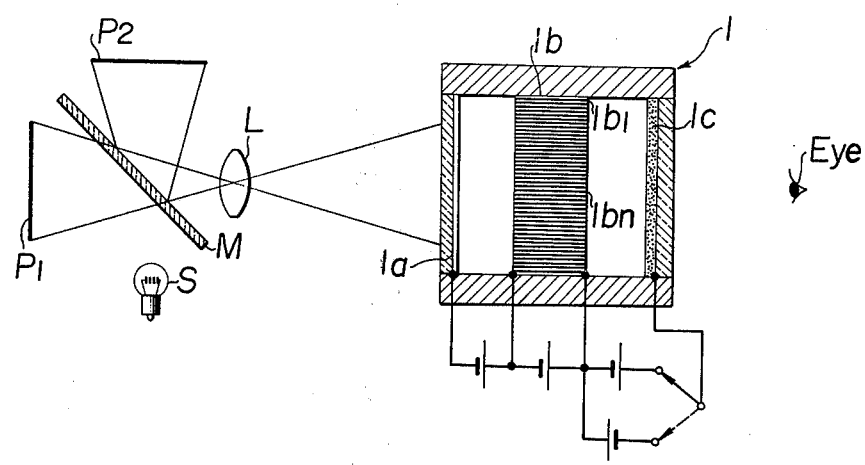
FIG. 1 is a side elevation of an apparatus according to one embodiment of the invention, showing principal parts thereof.

FIG. 1 shows an apparatus for carrying out the invention. When a light source S is turned on, the light from the source is reflected by a half mirror M to irradiate a reference pattern P1, the light rays reflected therefrom being passed through the half mirror M and focussed by a lens L on the photoelectric surface $1a$ of an image amplifier 1, forming a real image of the reference pattern P1 thereon. In the meantime, a pattern P2 to be collated is shielded by a shield plate, not shown. Photoelectrons are emitted by the photoelectric surface $1a$ of the image amplifier 1 in accordance with the image of the reference pattern, and are accelerated toward a channel plate $1b$ by an electric field which is established by a voltage applied between the photoelectric surface $1a$ and the end face of the channel plate $1b$ which is located nearer the photoelectric surface $1a$. The channel plate $1b$ comprises a multiplicity of thin glass tubes $1b1, 1b2 \ldots 1bn \ldots$ which have an inner wall that is processed as by chemical reduction to be enriched with metal, such tubes being bundled together to a density of several tens of thousand per centimeter and having their end faces aligned to be flush with each other. As the photoelectrons pass through the thin glass tubes, they collide with the inner walls of the tubes to generate secondary electrons, which also collide with the inner walls of the tubes to emit further electrons. The number of electrons produced within the tubes per photoelectron entering the tubes is on the order of $10^2$ to $10^8$ in number. The groups of electrons generated in this manner are accelerated by the voltage applied across the opposite end faces of the channel plate $1b$ and are collimated during their passage through the interior of the tubes toward the phosphor screen $1c$, these groups of electrons are further accelerated toward the phosphor screen $1c$ by an electric field established by a voltage applied between the latter and the end face of the channel plate $1b$ located nearer the phosphor screen $1c$. Where they impinge, the electrons cause an illumination of the phosphor screen $1c$, whereby a scintillation image is produced thereon in accordance with the reference pattern P1.

For the convenience of description, it is assumed that the reference pattern P1 comprises a letter A' inscribed in black ink on a white background and that the pattern P2 to be collated comprises a letter A also inscribed in black ink on a white background. These patterns are congruent except the prime on the letter A'. Under this condition, there will be produced a bright illumination on the phosphor screen $1c$ which corresponds to the white background of the reference pattern P1 while those portions corresponding to the letter A' are not illuminated, thus leaving the image of the letter A' dark. If the voltage applied between the phosphor screen $1c$ and the end face of the channel plate $1b$ located nearer the latter is now reversed or disconnected to prevent the motion of the groups of electrons emitted by the channel plate $1b$ toward the phosphor screen $1c$, the groups of electrons produced within the channel plate $1b$ will remain within the thin glass tubes $1b1, 1b2 \ldots 1bn \ldots$ or at least they can not reach the phosphor screen. Considering the situation on the end face of the channel plate $1b$, it will be understood that those areas of the photoelectric surface which represent the shadow for the stream of photoelectrons from the image of the reference pattern P1, or the glass tubes in those area which are covered by the shadow of the image of the letter A' will not have electrons generated therein, so that there exist glass tubes which are not filled with electrons, generally conforming to the image of the letter A'. Under this condition, the electrons in the channel plate $1B$ are prevented from reaching the phosphor screen $1c$, which therefore remains without illumination or dark. Now the light shield mentioned above (not shown) for the pattern P2 to be collated, which is in a position conjugate to that of the reference pattern P1 with respect to the half mittor M, is retracted to illuminate the pattern P2 with the light from the source S. Thereupon the rays reflected from the pattern P2 are reflected by the half mirror and are focussed by the lens L onto the photoelectric surface $1a$ in exact alignment with the image of the letter A' in the reference pattern P1 except the prime thereof. At this time, those portions of the photoelectric surface $1a$ which are illuminated, thus, the portions which correspond to the complement of the letter A, emit photoelectrons, which are accelerated toward the channel plate by the electric field mentioned above. At the same time, the voltage between the phosphor screen $1c$ and the end face of the channel plate $1b$ located nearer the latter, which has been reversed or disconnected previously is again reversed or reconnected to permit an acceleration of the electrons generated within the channel plate $1b$ toward the phosphor screen $1c$. However, those of the photoelectrons emitted by the photoelectric surface $1a$ and accelerated toward the channel plate $1b$ which are directed toward those glass tubes of the channel plate $1b$ which are filled with the preceding electrons cannot reach the channel plate $1b$ because of the electrostatic repulsion by the latter electrons and also because of a reduction in its electron multiplying function. As a result, the only area on the channel plate $1b$ which the photoelectrons can reach is the area thereof where there are glass tubes not filled with the electrons i.e. areas which correspond to the image area of the letter A' of the reference pattern P1. The photoelectrons reaching such an area come from the region which lies on the reference pattern P1, but which does not lie on the patter P2 to be collated, that is, the region corresponding to the prime on the reference pattern. As a consequence, a bright illumination occurs on the portion of the phosphor screen which corresponds to the prime. Then follow the electrons which stayed within the channel plate, so that the image of the pattern P2 to be collated appears if the reference pattern is shielded by the shield plate, not shown. However, during such an interval, the illumination or luminescence of the detected region continues, thereby reliably and easily assuring the detection. The image of the pattern P2 to be collated which appears in a time succession enables the recongnition of where the detected region lies on the pattern to be collated. The period of time for the portion of the channel plate which is filled with electrons to recover its multiplying function is feferred to as a recovery time, which is in substantially proportional relationship with the dinode resistance as disclosed in "Image Engineering Institute Material" issued by Denshi Tsushin Gakkai, Oct. 26, 1972, Material No. IT72–22 (1972-10). In one example, a channel plate having a recovery time response of from several to several thousand milliseconds has been prepared and used in an experiment.

By the method according to the invention, it is readily possible to detect a portion which lies on the reference pattern but which does not lie on a pattern to be collated in a reliable manner. By way of example, the collating method can be used with a photographic record of a phenomenon, such as the change of an affected part, which varies with time, to detect the location where the change occurs and the magnitude of such change in a reliable manner.

In the method described above, what is detected is a region which lies on the reference pattern but which does not lie on the pattern to be collated. However, subsequent to the detection of such region, the illumination of the pattern P2 to be collated may be maintained while the reference pattern p1 is shielded from the light source S by the shield plate, not shown. The voltage applied between the phosphor screen $1c$ and the end face of the phosphor screen $1c$ located nearer the channel plate $1b$ may be reversed or disconnected to cause the electrons generated within the channel plate $1b$ to remain within the glass tubes $1b1, 1b2 \ldots 1bn \ldots$ of the channel plate $1b$, and the shield plate (not shown) may be then retracted to expose the reference pattern P1 to the light source S for the purpose of irradiation while simultaneously reversing or re-connecting the above mentioned voltage to cause an acceleration of the electrons within the channel plate $1b$ toward the phosphor screen $1c$, thus enabling a region which lies on the pattern P2 and which does not lie on the reference P1 to be detected by way of an illuminated display on the phosphor screen $1c$.

By initially collating the pattern to be collated with respect to the reference pattern and then collating the reference pattern with respect to the pattern to be collated, any difference between the reference pattern and the pattern to be collated can be easily and reliably detected, so that the method of the invention can be extensively applied to uses including the identification of seal impressions and fingerprints, the determination of authenticity of paper currency, a comparison of spectral lines in spectroscopy, or the like.

Instead of reversing or disconnecting the voltage applied between the phosphor screen $1c$ and the end face of the channel plate $1b$ located nearer the latter, the voltage applied across the opposite end faces of the channel plate $1b$ may be reversed. Alternatively, the voltage applied across the end face of the channel plate $1b$ located nearer the photoelectric surface $1a$ and the phosphor screen $1c$ may be reversed or disconnected. As an alternative, the respective voltages may be continuously varied to permit some of the electrons generated within the channel plate which have a higher kinetic energy to reach the phosphor screen to thereby enable the image of the pattern to be faintly viewed on the phosphor screen, which is convenient in indicating the relative position of the detected region.

Figure 2A:
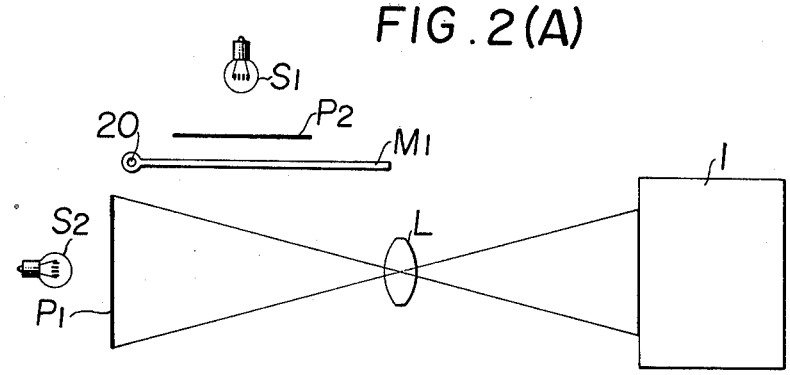
FIG. 2 is a similar view showing the principal parts of another apparatus according to the invention.
Figure 2B:
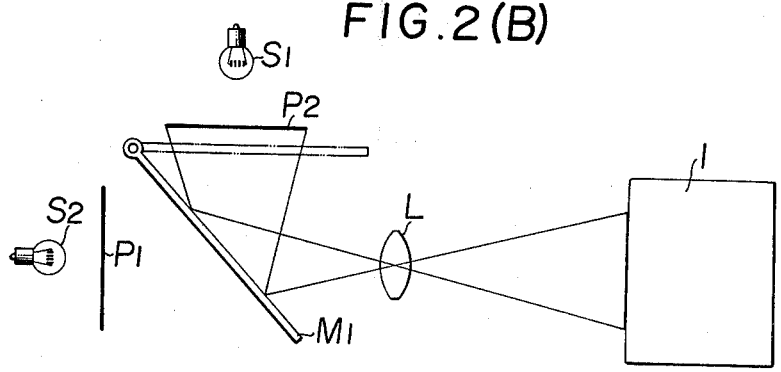

It is also possible to use a magnified or reduced image of the pattern by adjusting the respective distances between the lens L, the reference pattern P1 or the pattern P2 to be collated and the photoelectric surface $1a$.

Where the pattern is transparent to light, it is also possible to locate the light source rearwardly of the reference pattern or the pattern to be collated, thus performing the collating process by way of the light which transmitted through the pattern. In this instance, the quantity of light incident on the photoelectric surface of the image amplifier may be small, so that the transmittivity to light required of the pattern may be low (see FIG. 2). In this case, a conventional mirror M1 may be oscillated about a pivot 20 to serve a shield plate for either reference pattern P1 or pattern P2 to be collated.

What is claimed is:

1. A method of collating patterns comprising the steps of feeding a first pattern to an image amplifier having a channel plate generating secondary electrons at areas corresponding to a pattern fed to the image amplifier and having an output phosphor screen to produce a scintillation image of said secondary electrons, applying a controlled voltage to the amplifier to prevent groups of the secondary electrons generated within the channel plate of the amplifier from reaching the phosphor screen, removing said controlled voltage from the amplifier while secondary electrons generated within the channel plate remain within the channel plate, and concurrently feeding a second pattern to the amplifier to cause a region which lies on the first pattern and which does not lie on the second pattern to be displayed on the phosphor screen.

2. A method of collating patterns according to claim 1 in whicn subsequent to the application of the voltage, the first pattern is maintained to be fed to the image amplifier at least until the next application of the voltage.

3. A method of collating patterns according to claim 1 in which said voltage is chosen to permit the overlapping portions of the first and second patterns to be displayed on the phosphor screen with a reduced illumination as compared with that of the detected region during the display of the second pattern.

4. An apparatus for collating patterns comprising:
an image amplifier including channel plate means for generating secondary electrons at areas corresponding to a pattern applied to the image amplifier, said channel plate means having a finite recovery time response, and further including output phosphor screen means for producing a scintillation image of said secondary electrons;

means for applying a first pattern to said image amplifier to cause said channel plate means to generate secondary electrons at areas of the channel plate means corresponding to said first pattern;

means for applying controlled voltage between the channel plate means and the output phosphor screen means to prevent groups of said secondary electrons generated in the channel plate means from reaching the screen means; and means for disconnecting said controlled voltage from the channel plate means and the screen means while groups of said secondary electrons remain in the channel plate means and for concurrently applying a second pattern to said image amplifier to form on the screen means a scintillation image of the noncongruent portions of said first and second pattern.

5. An apparatus as in claim 4 including means for concurrently applying said first pattern and said second pattern to said image amplifier.

6. An apparatus as in claim 4 wherein said controlled voltage is in the range permitting the congruent portion of the first and second pattern to be displayed on said screen means at a lower intensity than that of the noncongruent portion of the pattern.

* * * * *